Figure 1:
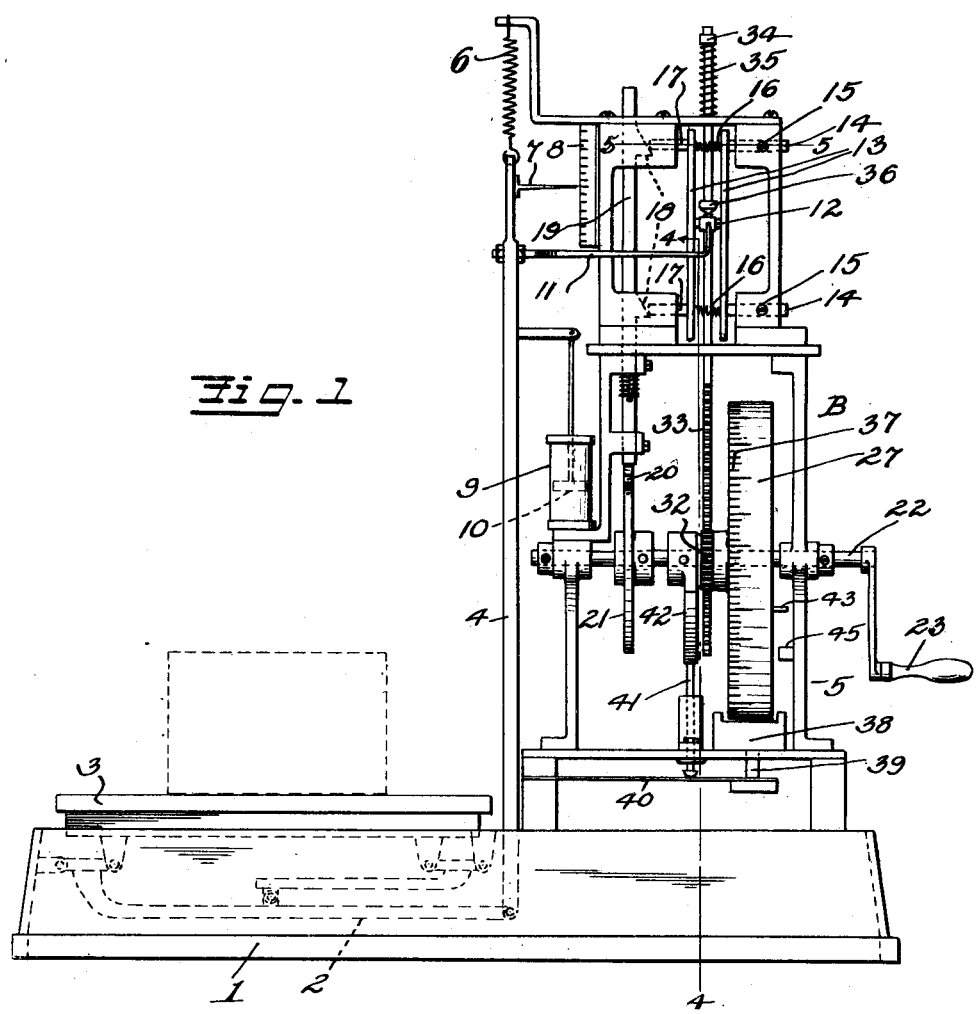

Aug. 26, 1930.  W. S. SMITH  1,774,296
WEIGHING MECHANISM
Filed June 8, 1927   3 Sheets-Sheet 1

Inventor
Walter S. Smith
By W. S. McDowell
Attorney

Aug. 26, 1930. W. S. SMITH 1,774,296
WEIGHING MECHANISM
Filed June 8, 1927 3 Sheets-Sheet 2
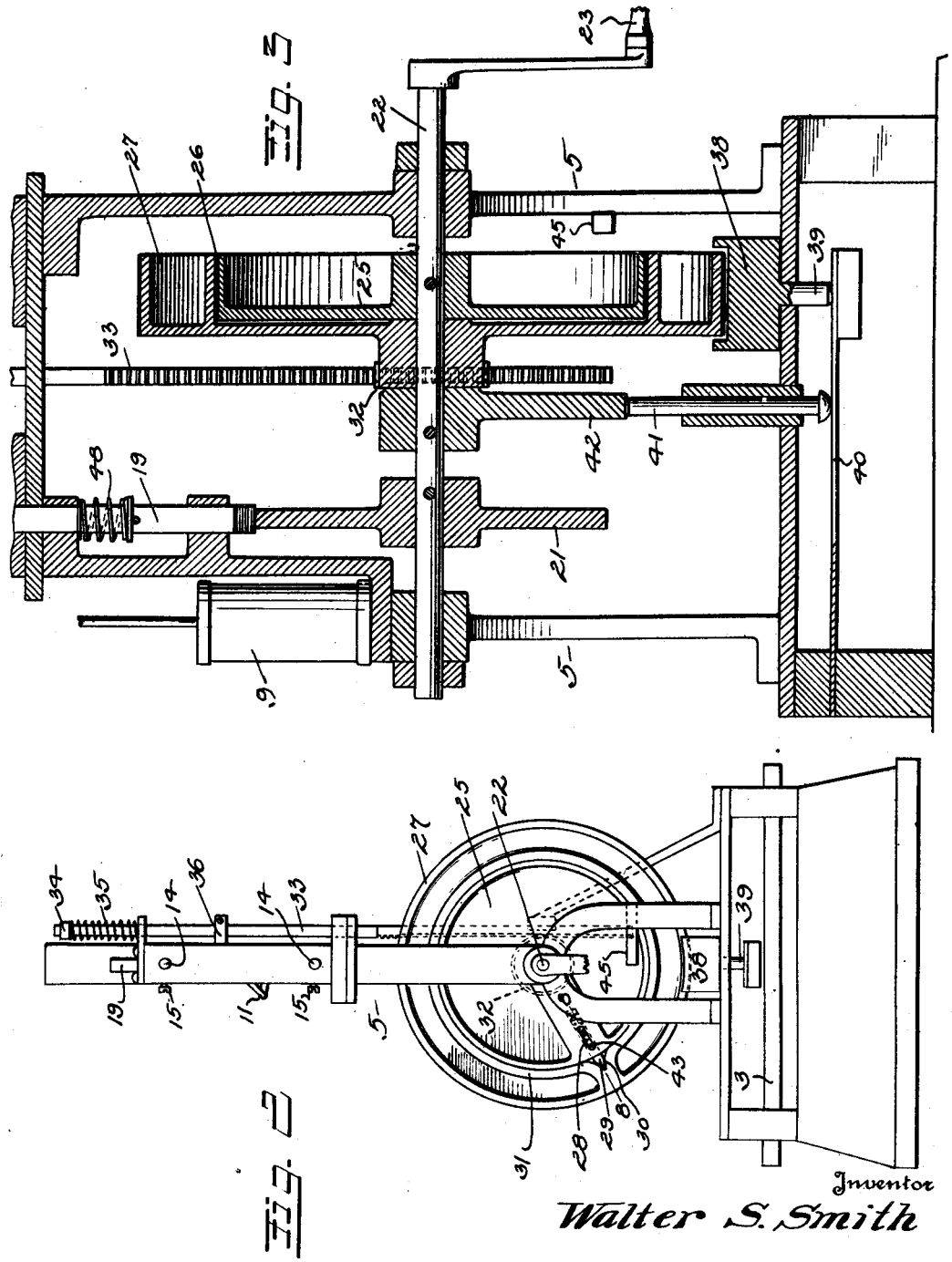
Inventor
Walter S. Smith
By W. S. McDowell.
Attorney

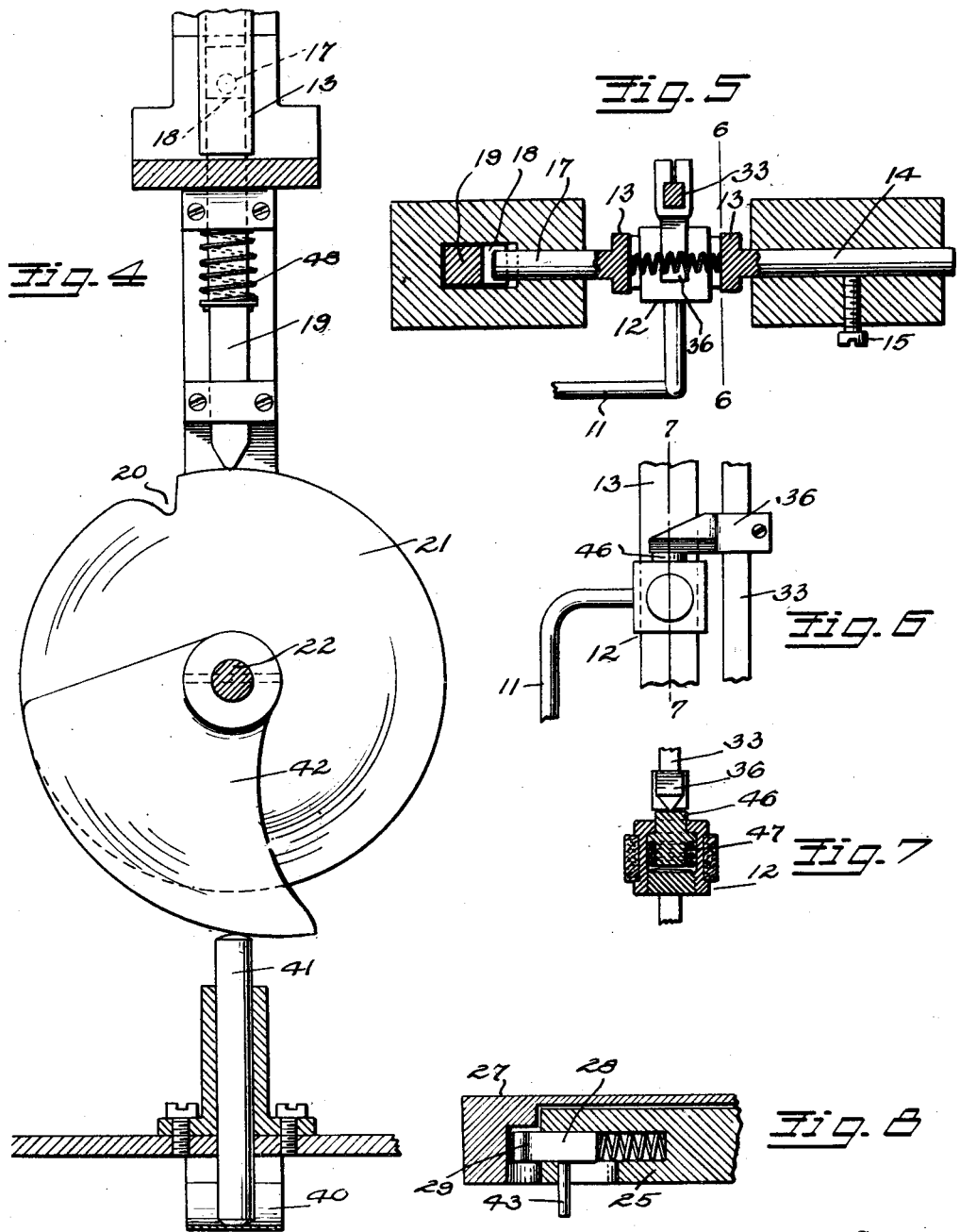

Patented Aug. 26, 1930

1,774,296

UNITED STATES PATENT OFFICE

WALTER S. SMITH, OF COLUMBUS, OHIO

WEIGHING MECHANISM

Application filed June 8, 1927. Serial No. 197,447.

This invention relates generally to improvements in weighing mechanism, and, with reference to the more specific features thereof, is especially directed to an improved recording attachment or unit adapted for cooperation with various types of weighing means in order to provide accurate graphic record of the individual weighing operation of such weighing devices in order that the users of such devices may be provided with relatively permanent data disclosing definitely and quantitatively the weights applied to such devices or mechanisms for weighing purposes.

While the invention has been specifically set forth as useful in connection with weighing devices or scales, never-the-less in certain of its broader aspects the invention may be employed in connection with, for example measuring apparatus, and its principles and advantages employed with considerable benefit and with corresponding facility as in conjunction with weighing units.

In the majority of recording scales heretofore developed the weighing unit and the recording unit have been mechanically coupled so as to operate conjunctively by the forces developed through the application of weight to the weighing unit proper. Due to the mechanical complications found in such recording units this places a considerable additional load on the weighing unit, so that due to friction losses, and the mechanical energy necessary to operate the recording unit, error is apt to be present in the finally recorded weight so as to render such units unfit for service where high degree of accuracy is required.

It is therefore an outstanding object of the present invention to provide a recording unit in connection with a weighing unit which shall be of such construction and operation that the normal functioning of each unit shall be maintained separate or independent of the other unit to prevent interchange of error, the arrangement being such that after the scale unit reaches a balance in response to an applied weight the movement of an element thereof from a normal or neutral position serves, without friction or the expenditure of mechanical energy, to control the extent of movement of the record producing member of said recording unit, the extent of movement of said record producing member from its normal position being directly proportional to the extent of movement of the movable element of the weighing unit from its normal position when responding to an applied weight.

The invention consists in the provision of a weighing mechanism formed to embody an element movable through a plurality of varying positions in proportional response to the weight of bodies applied to said weighing mechanism for weighing purposes, together with a recording apparatus of an independently operating character which is formed to include a means for positively locking said element in its various positions of deflection from normal, and in which recording mechanism there is provided a movable record producing member which operates subsequent to the locking of said element and has its effective movement governed by the various positions in which said element is locked, the arrangement being such that the movement of said record producing member from its normal position will be directly proportional to the movement of said scale element from its normal position, whereby complete and accurate registration is maintained between said weighing and recording unit at any period of operation.

For a further understanding of the invention, reference is to be had to the following description and the accompanying drawings, in which:

Figure 1 is a side elevation of the weighing and recording mechanism comprising the present invention, Figure 2 is an end elevation of the recording mechanism or unit, Figure 3 is a vertical longitudinal sectional view taken through the recording unit, Figure 4 is a transverse vertical sectional view taken on the line 4—4 of Figure 1, Figure 5 is a transverse horizontal sectional view taken on the line 5—5 of Figure 1, showing more particularly the clamping means for retaining the scale element in a locked position, Figure 6 is a detail sectional view taken on the line 6—6 of Figure 5, Figure 7 is a vertical sectional view taken on the line 7—7 of Figure 6, Figure 8 is a detail sectional view taken on the line 8—8 of Figure 2.

Referring more particularly to the drawings the numeral 1 designates a weighing unit which, in the specific embodiment of the invention disclosed consists of a weighing scale formed to include a base 1 in which is pivotally mounted in the usual manner a beam or lever 2, one end of the latter being connected with a weight receiver or platform 3, while the other end is connected with an upright steelyard rod 4. Arising from the rear part of the base 1 is an upright frame structure 5, to the upper portion of which is adjustably connected a tension spring 6, the opposite end of said spring being connected with the upper end of the steelyard rod 4. Normally, the tension of the spring 6 is such as to balance the weight of the platform or receiver 3 when the latter is unloaded, and thereby maintain the scale in the balanced condition. Upon the application of weights to the receiver the steelyard rod is moved downwardly against the resistance offered by the spring 6, the extent of deflection or movement of the rod 4 being proportionate to the weight applied to the platform 3. If desired, the rod 4 may be provided with an indicator 7 which is movable over the fixed graduated surface 8 for the purpose of facilitating the reading of the scale and noting the deflection thereof from normal. The frame structure 5 may be provided with a dash pot 9, in which is mounted a piston 10 movable in unison with the rod 4, so as to stabilize and dampen the vibrations of the rod 4 and associated parts, when the scale is in use. The weighing unit thus described is of standard construction and operation and no claim is made to the same hereinafter per se and therefore I do not desire to be limited in an interpretation of the scope of this patent to the specific type of weighing unit herein described and illustrated, but desire to include in the purview of the invention all types of weighing units wherein a movable element is provided, equivalent to the rod 4, which will vary or shift in position from a given normal when responding to the influence of weights of different avoirdupois value.

The recording mechanism designated generally by the letter B and while its operation is controlled or regulated by the operation of the weighing unit yet the latter does not positively operate the recording mechanism. The weighing unit merely serves to set, as it were, the operation of the recording mechanism but does not otherwise enter into its positive function and thus to a large degree, as will be hereinafter explained, the recording mechanism is independent of the weighing mechanism. This is one of the outstanding features of the present invention and attention is directed thereto for the purpose of clarifying and interpreting the following disclosure. Fixed upon and movable in unison with the rod 4 is a laterally extending arm 11, the outer end of which is inwardly bent and is provided with a head 12. This head moves in parallelism and in unison with the rod 4, the positions of the head varying in exact proportion to the variations in the operating positions of the steelyard rod. The head is mounted for vertical travel in a normally free manner between a pair of vertically disposed clamping bars 13. One of these bars is stationarily carried by a pair of pins 14, which are adjustably mounted in bearing openings formed in connection with the frame structure 5. Set screws 15 are utilized for fixing the positions of the pins 14 and consequently the position of the stationary bar 13 in relation to the head 12. The bars 13 are normally spaced from engagement with the head 12 through the use of a pair of expansible springs 16, and the movable bar 13 also carries a pair of vertically spaced pins or studs 17, which are slidably mounted within bearing openings provided therefor in the frame structure 5.

The outer ends of the studs 17 engage normally with a pair of wedge shaped projections 18 provided upon a vertically movable bar 19, journaled in connection with the frame structure 5. The lower end of this bar is normally seated within a notch or depression 20 provided in the periphery of a disk 21 which is fixed for rotation upon the main operating shaft 22 of the recording mechanism. This shaft is disposed horizontally for rotation about its longitudinal axis in connection with the frame structure and, in this instance, has the outer end thereof provided with an operating crank or handle 23, which permits the shaft to be manually rotated. It is obvious, however, that manual rotation of the shaft may be dispensed with and a power driven or automatic means provided in lieu thereof. In order to simplify the development of the principles of the invention I have shown the shaft as being rotated manually, although other suitable means may be employed.

It will thus be seen that the plates or bars 13 do not normally interfere with the freedom of operation normally alotted to the scale mechanism. However, when the steelyard rod reaches its position of final deflection or balance in response to a given applied weight, the shaft 22 is rotated manually. This causes the rotation of the disk 21, and the immediate elevation of the bar 19 due to the sharply inclined walls of the notch 20. The elevation of the bar 19 results in causing the wedge shaped projections 18 thereof to act on the studs 17 and force the movable feeding bars 13 into clamping engagement with the head 12 of the steelyard arm, thereby locking the steelyard arm for a predetermined interval against further movement. It will be noted that this operation does not effect in any way the weighing efficiency or operating positions of the mechanism of the scale unit proper, relieving the latter mechanism of any additional functions other than its customary function of denoting weights. The head 12 has its side walls provided with frictional inserts 24 which may be formed from any suitable material such as leather, by which the co-efficient feed between the head and the clamping bars may be increased to prevent slipping or loss of position of the head when gripped by the clamping bars. Upon full rotation of the operating shaft 22 to the lower end of the bar will be restored into its position within the notch or depression 20 of the disk 21, so that the bars 13 may separate by being released from cooperation with the wedge shaped projections 18 and also in response to the action of the springs 16.

Fixed upon and rotatable with the shaft 22 is a circular plate 25, which is rotatably mounted within a circular pocket 26 provided upon a recording wheel or drum 27 which, in turn, is loosely mounted upon the shaft 22. Driving relationship between the plate 25 and the wheel 27 is maintained for a given period by providing the plate 25 with a spring pressed plunger 28, provided at its outer end with a beveled enlargement 29. Normally, this enlargement is received within a locking recess 30 provided in the periphery of a circular wall 31 formed integrally within the structure of the wheel 27. This arrangement of parts is such that when the shaft 22 is rotated the plate 25 and the loosely mounted wheel 27 would revolve unitarily with the shaft. However, by locking the wheel 27 against further rotation the beveled walls of the recess 30 permit of the retraction of the plunger 28 from its normal position within the recess and thereby allow of continued rotation on the part of the shaft 22 and the plate 25 without effecting the fixed position of the recording wheel 27.

The hub of the wheel 27 is formed with a pinion 32 which meshes with a vertically extending rack bar 33. This rack bar is journaled in connection with the frame structure 5, and has its upper end provided with a fixed collar 34, between which and the top of the frame structure there is interposed a coil spring 35, which tends normally to maintain the rack bar elevated. Fixed upon the rack bar is a laterally disposed finger 36, which is normally positioned between the clamping bars 13 and above the head 12. It will be seen that as the wheel 27 rotates in unison with the shaft 22 the rack bar will be lowered by the operation of the pinion 32 against the resistance of the coil spring 35. This lowering movement on the part of the rack bar is arrested by the engagement of the finger 36 with the head 12, and consequently corresponding rotation on the part of the wheel 27 is arrested by the fact that the rack bar can not be lowered after the finger 36 thereof engages with the positively locked head 12.

The outer periphery of the wheel 27 is provided with an arcuate scale or die graduated preferably into points and analysis, as indicated at 37, and this die is adapted to register with a striking block 38, movably carried in connection with the bottom of the frame structure 5. The block 38 includes a depending stem 39, which is adapted to be engaged by the outer end of a strong leaf spring 40, the tendency of the spring being to force the block upwardly into engagement with the surface of the printing die 37. Normally, during the rotation of the shaft 22 the block is spaced from the die 37 by means of a vertically movable plunger 41, the lower end of the latter being in engagement with the spring 40, and the upper end thereof in engagement with the periphery of a cam 42 fixed upon the shaft 22. The operation of the mechanism has been so timed that when the recording wheel 27 has been brought to a complete stop by the engagement of the finger 36 with the locked head 12, the cam 42 will be released from engagement with the upper end of the plunger 41, so as to allow the fixed leaf spring 40 to spring upwardly, moving the block 38 in unison therewith. A recording strip of paper or cardboard over which is placed a strip of carbon paper is positioned between the block 38 and the die 37, so that when the block moves upwardly the recording strip or ticket will receive the impression from the recording die 37, which gives the weight in pounds and ounces of the weight applied to the receiving platform 3 of the scale unit. The spacing of the graduations on the impression from the die 37 is in accordance with or in proportion to the movement of the weighing element 4 from a neutral or given position, and this can be sealed or ascertained with such accuracy as to provide for the closest co-ordination between the weighing and recording units.

The plunger 28 is provided with a laterally projecting pin 43 which is adapted to engage with a cam surface 45 formed on the frame structure 5 at approximately the end of the rotative scale of the plate 25. The engagement between the pin 43 and the cam surface 45 results in moving the head 29 inwardly against the spring pressure, thereby releasing the frictional grip between the plunger and the wall of the pocket 26 so that the spring 35 may return the rack bar and the wheel 27 to their normal positions. When the pin 43 rides off of the cam surface 45 the head 29 of the plunger is again seated within the recess 30, and the parts of the recording mechanism are again normally held and locked for a subsequent operation. It will be appreciated that normally there is sufficient frictional pressure between the head 29 and the periphery of the pocket 26 provided in the wheel 27 to hold the spring 35 depressed, but by the action of the cam surface 45 and the pin 43 this pressure is momentarily released to allow the parts to return to their normal positions.

If desired, the head 12 may have its upper surface provided with a block 46 pressed upwardly by a strong encased spring 47 situated in the head 12. This block serves to absorb the shock incident to the engagement of the finger 36 with the head 12, to prevent any loss in position on the part of the clamped head 12. However, the resiliency of the block 46 is not sufficient to in any way impair the accuracy of the recording mechanism. A spring 48 cooperates with the bar 19 to maintain the lower end of the latter positively in engagement with the periphery of the disk 21, and the engagement of the lower end of this bar with the notch or depression 20 also serves to lock parts of the recording mechanism in a normal or given position.

In view of the foregoing it will be seen that the present invention provides a simple, reliable, easily operated recording mechanism practically applicable for use in connection with weighing scales through the use of which the operator of the scale, as well as the customer will be given a graphic record of each weighing operation on the part of the scale. It will be observed that in contra-distinction to other recording types of scales the present invention does not require the scale mechanism per se to perform any other function than to merely seat or trip the recording mechanism. This therefore relieves the scale mechanism of any added functional duties, such as effecting the operation of the recording mechanism. This produces both a weighing and recording mechanism of high accuracy.

What is claimed is:

1. The combination with a scale having an element movable to different positions in proportion to the weight of the article weighed, of a recording unit comprising a supporting frame, a shaft mounted for rotation on said frame, a recording wheel carried by said shaft, means operable upon the initial movement of said shaft for locking said element in its effective position, means for limiting the movement of said recording wheel in accordance with the effective position of said element, a movable printing block carried by said frame, a recording strip between said block and wheel, a cam on said shaft, and a connection between said shaft and recording wheel permitting of the rotation of said shaft after the arrest of movement of said wheel whereby said cam will cause said block to effect an impression on said strip in accordance with graduations on the outer surface of said wheel.

2. The combination with a scale having an element carried thereby and movable to different positions in proportion to the weights of the article weighed, of a recording mechanism comprising an upstanding frame structure, a shaft journaled in said frame, a recording wheel on said shaft having a notch in its inner periphery, a hub fixed to said shaft, a spring pressed plunger carried by said hub and normally occupying said notch, means operable upon the initial movement of said shaft for locking said element in its effective position, a gear carried by said recording wheel, a rack bar, a finger on said bar positioned in the path of said element and serving to limit the movement of said recording wheel in accordance with the effective position of said element, a spring connected with said rack bar, and means formed with said frame and plunger to retract the latter from engagement with the periphery of said wheel whereby said spring will return the recording wheel to its normal position.

3. The combination with a scale having an element movable from a normal position in proportional increment to the weight of bodies applied to said scale for weighing purposes, of a recording apparatus for providing graphic indications of the weight of said bodies, comprising a rotatable shaft, a circular record producing member carried by said shaft having a graduated outer periphery, means operable upon the initial movement of said shaft for locking said element in its effective position, means for limiting the movement of said record producing member in accordance with the effective position of said element, a movable printing block positioned in close proximity with the outer graduated surface of said record producing member, a record strip interposed between said block and said graduated surface, a cam carried by said shaft, and a spring and plunger mechanism operated by said cam for effecting a striking blow on said block whereby a printing impression is made on said strip.

4. The combination with a scale having an element movable to different positions in proportion to the weight of the article weighed, of a recording unit comprising a supporting frame, a shaft mounted for rotation on said frame, a recording wheel carried by said shaft, means operable upon the initial movement of said shaft for locking said element in its effective position, means for limiting the movement of said recording wheel in accordance with the effective position of said element, a movable printing block carried by said frame, a recording strip between said block and wheel, a connection between said shaft and recording wheel permitting of the rotation of said shaft after the arrest of movement of said wheel, and means operable with said shaft for controlling the printing action of said block.

In testimony whereof I affix my signature.

WALTER S. SMITH.